United States Patent
Damske (10) Patent No.: US 9,795,129 B2
(45) Date of Patent: Oct. 24, 2017

(54) SIDE MOUNTED FOLDABLE TREE STAND

(71) Applicant: Chris Damske, New Berlin, WI (US)

(72) Inventor: Chris Damske, New Berlin, WI (US)

(73) Assignee: King Outdoors, LLC, New Berlin, WI (US)

( * ) Notice: Subject to any disclaimer, the term of this patent is extended or adjusted under 35 U.S.C. 154(b) by 2 days.

(21) Appl. No.: 14/955,595

(22) Filed: Dec. 1, 2015

(65) Prior Publication Data

US 2017/0150710 A1  Jun. 1, 2017

(51) Int. Cl.
*A01M 31/02* (2006.01)
*A47C 9/10* (2006.01)

(52) U.S. Cl.
CPC ............... *A01M 31/02* (2013.01); *A47C 9/10* (2013.01)

(58) Field of Classification Search
CPC ...................................................... A01M 31/02
See application file for complete search history.

(56) References Cited

U.S. PATENT DOCUMENTS

| | | | | |
|---|---|---|---|---|
| 3,006,433 A | * | 10/1961 | Farver | A01M 31/02 |
| | | | | 297/380 |
| 3,266,686 A | * | 8/1966 | Griffith | A45F 4/02 |
| | | | | 224/155 |
| 4,727,961 A | * | 3/1988 | Dawson | A45F 3/26 |
| | | | | 108/152 |
| 4,840,252 A | * | 6/1989 | Hucks, Jr. | A01M 31/02 |
| | | | | 182/187 |
| 5,009,284 A | * | 4/1991 | Authement, Sr. | A45F 3/26 |
| | | | | 182/129 |
| 5,381,941 A | * | 1/1995 | Brune | A45F 4/02 |
| | | | | 224/153 |
| 5,462,135 A | * | 10/1995 | Ambler | A01M 31/02 |
| | | | | 182/187 |
| 5,975,389 A | * | 11/1999 | Braun | A01M 31/02 |
| | | | | 182/187 |

FOREIGN PATENT DOCUMENTS

DE                363402 C  * 11/1922  ............ A01M 31/02

* cited by examiner

*Primary Examiner* — Alvin Chin-Shue
(74) *Attorney, Agent, or Firm* — Reinhart Boerner Van Deuren P.C.

(57) ABSTRACT

A tree stand is provided. The tree stand includes a seat assembly and foot rest assembly. The seat assembly is mounted to the foot rest assembly and includes a seat and a seatback. The tree stand also includes a pair of mounting plates which mount to either side of the tree stand such that it may be side-mounted to a tree or other mounting body. The seatback is reclinable relative to the seat unobstructed by the mounting body.

9 Claims, 8 Drawing Sheets

SIDE MOUNTED FOLDABLE TREE STAND

FIELD OF THE INVENTION

This invention generally relates to recreational equipment, and more particularly to tree stands for hunting and other uses.

BACKGROUND OF THE INVENTION

As is known in the art, a tree stand is a device which a hunter can mount to a tree or other vertically extending mounting body and sit or stand in the same while hunting. The position of the mounted tree stand is such that the hunter is elevated above their prey. This allows for a reduced likelihood that the prey will detect the hunter.

Tree stands have conventionally been permanent customized structures which hunters would construct using wood or other materials. Such permanent stands, however, fix the hunter to a single location which may be undesirable.

As a result, there have been various portable, temporary stands developed. Such portable tree stands have the advantage of allowing a hunter to hunt using the same tree stand in different areas based on their discretion, as opposed to a single fixed location.

Unfortunately, such portable tree stands are not without their drawbacks. For example, these tree stands are essentially a seat with a seatback. The seatback is abutted against the tree. As a result, when sitting, the hunter is forced to sit completely upright and generally perpendicular to the seat itself. In other words, the seatback is not capable of reclining relative to the seat, as it is abutted against the tree. This can lead to hunter discomfort, especially when the hunter is on a long hunt awaiting their prey.

Further, because the seatback abuts against the tree, only a single hunter can face in the same direction on the same tree, where multiple stands are employed on the same tree. This is undesirable where a pair of hunters, e.g. a hunter and their guide or a parent and their child, etc., wish to face in the same direction and focus on the same prey.

Accordingly, there is a need in the art for a tree stand which takes into account ergonomic principles, especially given the extended time period in which a hunter may be in the tree stand. Further, there is a need in the art for a tree stand which allows for multiple hunters to face in the same direction when using multiple tree stands.

The invention provides such a tree stand. These and other advantages of the invention, as well as additional inventive features, will be apparent from the description of the invention provided herein.

BRIEF SUMMARY OF THE INVENTION

In one aspect, a tree stand is provided which provides a more ergonomic solution than prior designs. An embodiment of a tree stand according to this aspect includes a seat assembly which has a seat and a seatback mounted to the seat. The tree stand also includes footrest assembly which includes a frame, a leg extension mounts to the frame at a first end of the leg extension, and a footrest mounted to a second end of the leg extension. The seat assembly is mounted to the footrest assembly. The tree stand also includes a pair of removable mounting plates for mounting the tree stand to a mounting body in a mounted position such that the seatback is pivotable relative to the seat unobstructed by the mounting body.

The seat assembly defines a first pivot access. The seatback is pivotable about the first pivot access relative to the seat. The seatback may be pivoted at an angle of greater than 90 degrees relative to the seat in the mounted position. The tree stand may also include a strap extending between the seat and the seatback which is operable to fix a maximum angular orientation of the seatback relative to the seat.

The seatback includes a pair of longitudinal members arranged in an opposed space relationship. A plurality of lateral members extend between the pair of longitudinal members. The seatback further includes a first plurality of webbings extending between the longitudinal members of the seatback.

The seat includes a pair of longitudinal members arranged in an opposed space relationship. A plurality of lateral members extend between the pair of longitudinal members. The seat further includes a second plurality of webbings extending between the longitudinal members of the seat.

The frame includes a pair of longitudinal members arranged in an opposed space relationship, with a plurality of lateral members extending there between. The leg extension also includes a pair of longitudinal members arranged in an opposed space relationship with a plurality of lateral members extending there between. The lateral members of the frame and of the leg extension may be rigid tubular members.

The leg extension is pivotable about a second pivot axis relative to the frame. The footrest is pivotable about a third pivot axis relative to the leg extension. The first, second, and third pivot axes are parallel to one another.

The seat assembly and footrest assembly together define opposing longitudinal sides of the tree stand. The pair of mounting plates are removably mountable to either one of the opposing longitudinal sides of the tree stand.

The tree stand has a folded and an unfolded configuration. In the folded configuration, the seatback lies in a first plane, the seat lies in a second plane, the frame lies in third plane, the leg extension lies in a fourth plane, and the footrest lies in a fifth plane. The first, second, third, fourth, and fifth planes are parallel to one another.

In another aspect, a tree stand is provided which advantageously allows for multiple tree stands to mount to a mounting body and face in the same direction. An embodiment of such a tree stand according to this aspect includes a seat assembly and a footrest assembly. The seat assembly is mounted to the footrest assembly. The seat assembly and footrest assembly define opposing longitudinal sides of the tree stand. The tree stand also includes a pair of mounting plates. The pair of mounting plates are configured for mounting the tree stand to a mounting body. The pair of mounting plates are removably mountable to either of the opposing longitudinal sides of the tree stand.

The seat assembly includes a seat and a seatback. The footrest assembly includes a frame, a leg extension mounted to the frame, and a footrest mounted to the leg extension. The tree stand has a folded and an unfolded configuration. In the folded configuration, the seatback lies in a first plane, the seat lies in a second plane, the frame lies in a third plane, the leg extension lies in a fourth plane, and the footrest lies in a fifth plane. The first, second, third, fourth, and fifth planes are parallel to one another.

In yet another aspect, a tree stand is provided which advantageously has a folded configuration in which allows for easy storage and carrying by a user. An embodiment of such a tree stand includes a seat assembly which includes a seat and a seatback. The seatback is pivotable about the seat about a first pivot axis. The tree stand also includes a footrest assembly which includes the frame, a leg extension mounted to the frame at a first end of the leg extension, and a footrest mounted to a second end of the leg extension. The seat assembly is mounted to the footrest assembly. The tree stand also includes a pair of mounting plates mounted to the frame. The tree stand has a folded and an unfolded configuration. In the folded configuration, the seatback lies in a first plane, the seat lies in a second plane, the frame lies in a third plane, the leg extension lies in a fourth plane, and the footrest lies in a fifth plane. The first, second, third, fourth, and fifth planes are parallel to one another.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Turning now to the drawings, FIGS. 1-13 illustrate an embodiment of a tree stand according to the teachings herein which advantageously overcomes existing problems in the art. Specifically, the embodiment described herein mounts to a side of a tree or other mounting body. Such a side mounted configuration allows a user to recline a seat back relative to a seat unobstructed by the mounting body. This provides for a more ergonomic tree stand than those designs which puts a user's back directly against a tree. Further, the embodiment of the tree stand described herein has removable side mounting plates. These removable side mounting plates advantageously allow two tree stands to mount to opposing sides of a tree or another mounting body. As a result, multiple users may face in the same direction. Such a configuration is advantageous for example when a hunter is hunting with a guide, or a parent is hunting with a child. These and other advantages will be discussed in greater detail by the following description.

Figure 1:
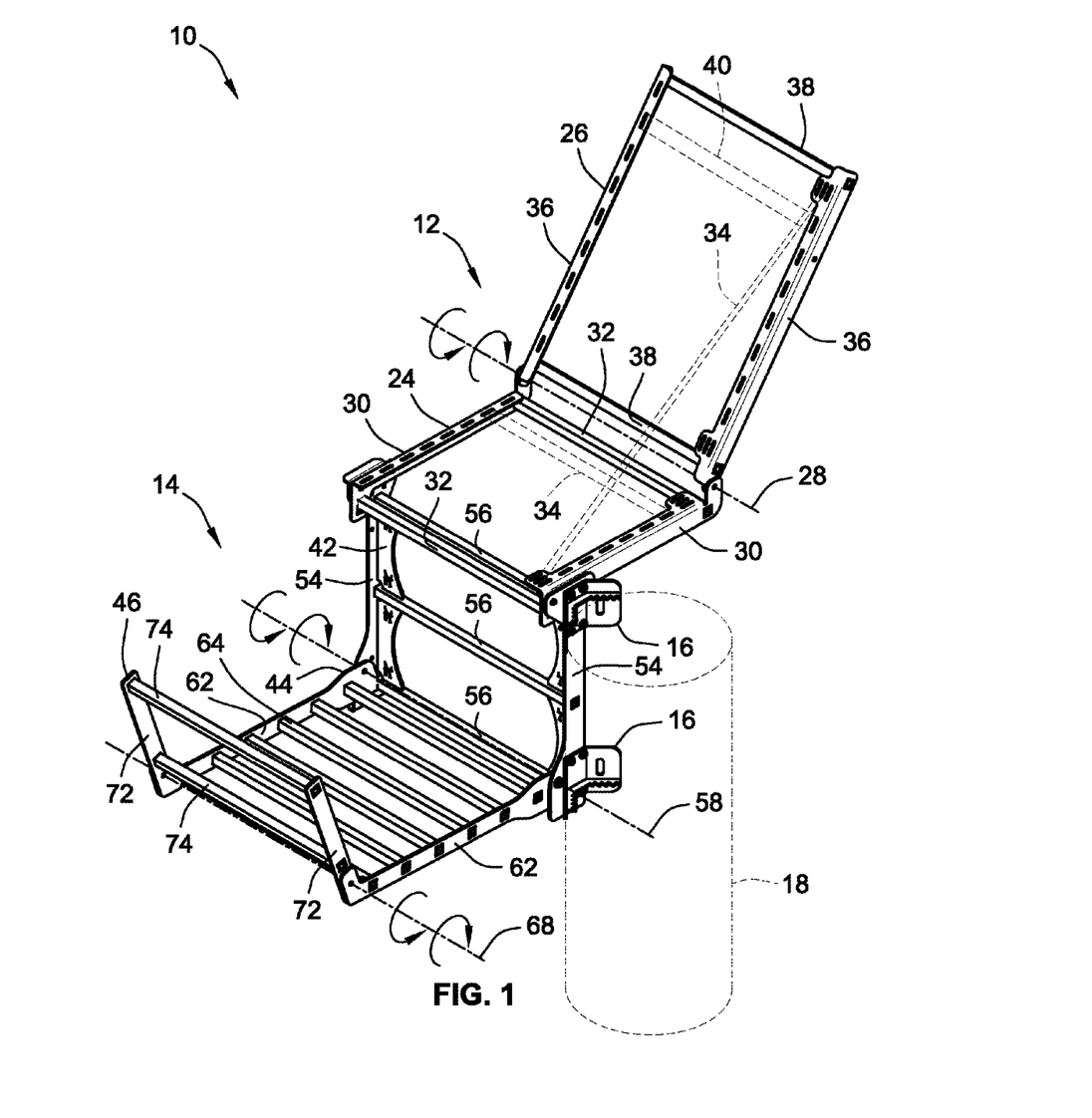
FIG. 1 is a perspective view of an exemplary embodiment of a tree stand according to the teachings herein in an unfolded configuration.

Turning first to FIG. 1, an embodiment of a tree stand 10 according to the teachings herein is illustrated. Tree stand 10 includes a seat assembly 12 which is mounted to a footrest assembly 14. Tree stand 10 also includes a pair of removable mounting plates 16 which may mount to either of the opposed sides of tree stand 10. Mounting plates 16 are utilized to mount tree stand 10 to a mounting body 18 which is illustrated in FIG. 1 as a generally cylindrical body. In typical use, mounting body 18 will be a tree. However, it will be recognized that any rounded surface may be utilized including telephone poles, etc.

Seat assembly 12 includes a seat 24 and a seatback 26 pivotably attached to seat 24 about a first pivot axis 28 as shown. Seatback 26 is rotatable about first pivot axis 28 in either of the rotational directions illustrated. Seat 24 includes a pair of opposed longitudinal members 30 with a pair of opposed lateral members 32 positioned and extending therebetween. Additionally, a plurality of webbings 34 (with only one of such webbings illustrated for clarity) are routed through slots in longitudinal members 30 to provide a supporting surface for a user in seat 24. It will be readily understood that such webbings 34 are lightweight and flexible and reduce the overall weight of tree stand 10.

Similarly, seatback 26 includes a pair of opposed longitudinal members 36 with a pair of lateral members 38 positioned and extending there between. A plurality of webbings 40 (with only one of such webbings illustrated for clarity) are mounted through slots in longitudinal members 36 of seatback 26 to provide a surface with which a user may rest their back against.

As will be understood in greater detail below, seat assembly 12 is a subassembly of tree stand 10. Seat assembly 12 is detachable from tree stand 10 and individually foldable about first axis 28 as will be described below.

Turning now to footrest assembly 14, the same includes a frame 42, a leg extension 44 extending from frame 42, and a footrest 46 extending from leg extension 44. As can be seen from inspection of FIG. 1, leg extension 44 is attached to one end of frame 42, while seat assembly 12 (in more particularly seat 24) is attached to the other end of frame 42.

Frame 42 includes a pair of opposed longitudinal members 54. A plurality of lateral members 56 are positioned and extend there between. Leg extension 46 attaches to frame 42 along a second pivot access 58 as shown. Leg extension 46 is pivotable about second pivot axis 58 in either of the rotational directions illustrated relative to frame 42.

In a similar fashion, footrest 46 is attached to leg extension 44 along a third pivot axis 68. Footrest 46 is pivotable about third pivot axis 68 relative to leg extension 44 in either of the rotational directions illustrated. Footrest 46 includes a pair of opposed longitudinal member 72 cuffed with a pair of lateral members 74 positioned and extending there between.

When in the unfolded configuration as illustrated in FIG. 1, the ends of longitudinal members 62 of leg extension 44 abut the bottom most lateral member 56 of frame 42 to prevent continued rotation of leg extension 44 about second pivot axis 58 relative to frame 42. In a similar fashion, the ends of longitudinal member 72 of footrest 46 abut the outermost lateral member 64 to prevent continued rotation about footrest 46 about third pivot axis 64 relative to leg extension 44.

Unlike the aforementioned mechanical stops preventing further rotation of the aforementioned components, seatback 26 utilizes a strap 34 which extends between seatback 26 and seat 24 and is illustrated generally schematically in FIG. 1. Strap 34 is routed through slots formed in seat 24 and seatback 26. This strap may be any conventional ratchet strap or the like which is strong enough to fix the angular position of seatback 26 relative to seat 24 despite continued force applied against seatback 26 by a user when situated in seat assembly 12. Strap 34 thus fixes the maximum angular travel of seatback 26 relative to seat 24 about first pivot axis 28. Strap 34 may be adjustable to manipulate this maximum angular travel. This adjustability may be achieved by any type of buckle utilized on the strap recognized for adjusting and fixing the length of a strap.

Figure 2:
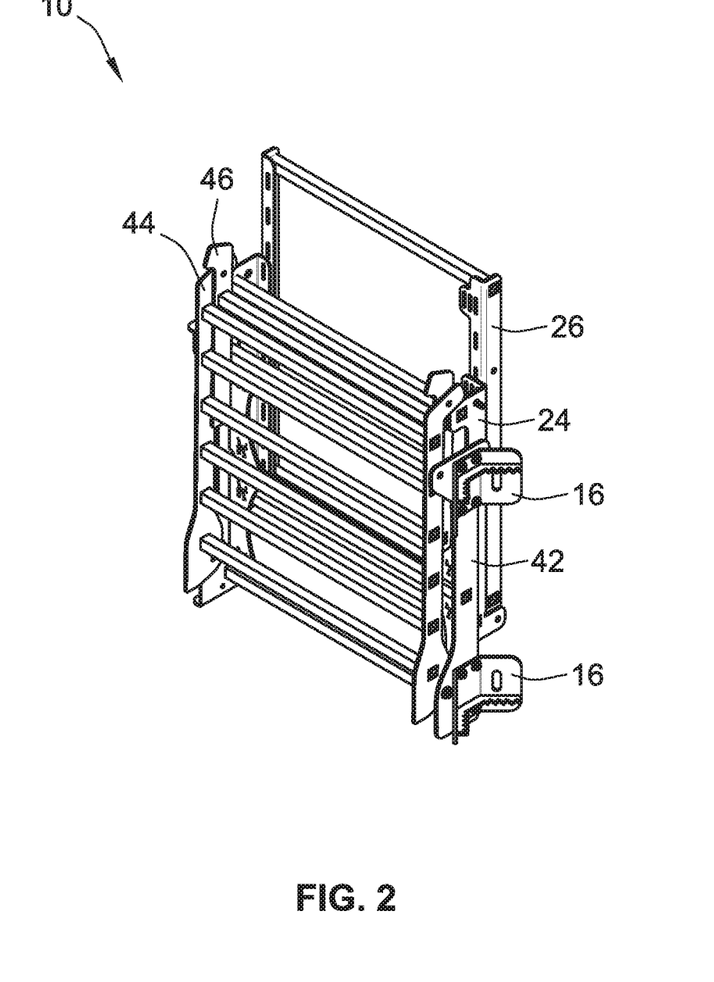
FIG. 2 is a perspective view of the tree stand of FIG. 1, in a folded configuration.

Turning now to FIG. 2, tree stand 10 is illustrated in its folded configuration. As will be explained in further detail below, seat assembly 12 is separated from footrest assembly 14. Both of these subassemblies are folded about their respective pivot axes as described above, and situated together in a compact package as illustrated in FIG. 2. Straps may be utilized to hold these components together once in the folded configuration. Advantageously, strap 34 as described above is utilized to limit the maximum angular travel of seatback 26 relative to seat 24 may be used to achieve this function of whole seat assembly 12 and footrest assembly 14 in there folded configuration as shown.

Figure 3:
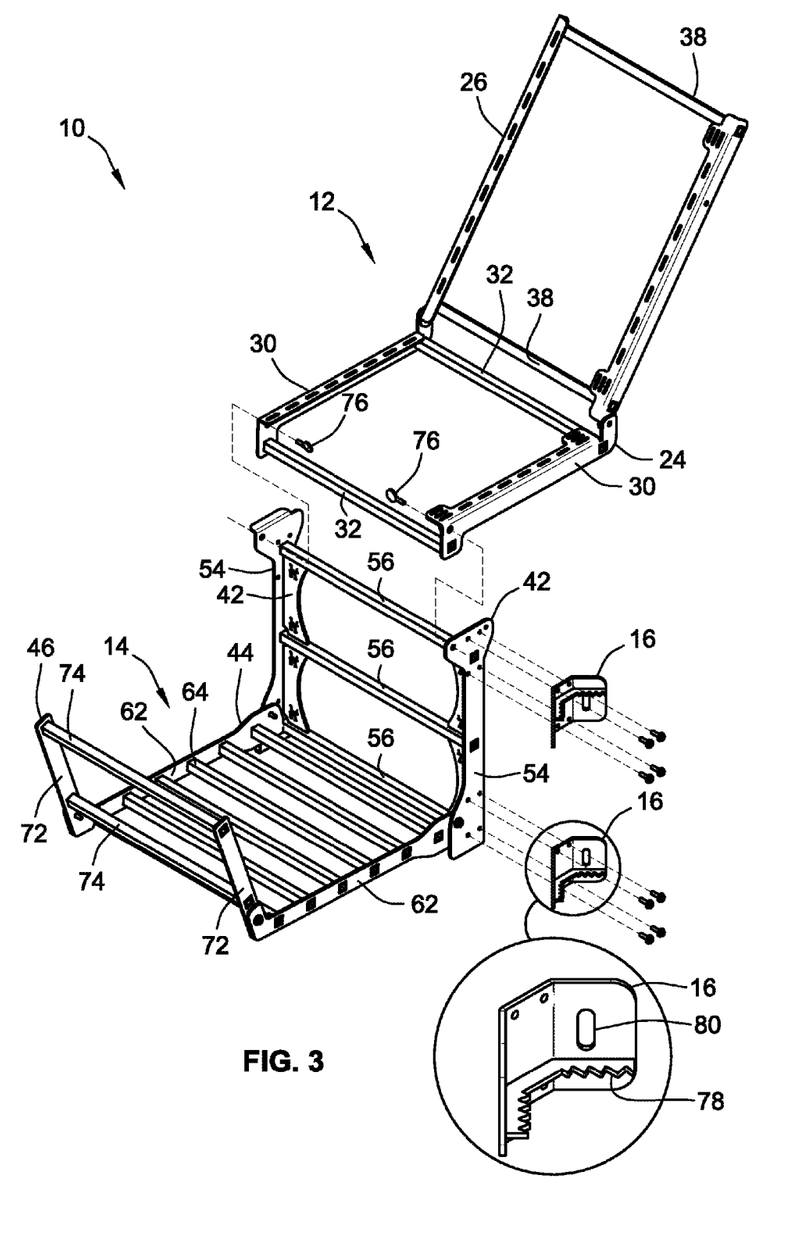
FIG. 3 is a perspective exploded view of the tree stand of FIG. 1.

Turning now to FIG. 3, tree stand 10 is illustrated in an exploded view. As can been seen therein, mounting plates 16 are removeably attachable to either side of tree stand 10. By "removably" attached it is meant that the mounting plates 16 are designed to be interchangeable with either longitudinal side of tree stand 10 by fastening the same using hardware such as bolts and nuts or the like. Such a configuration is distinct from a design with non-removably attached mounting plates, such as mounting plates permanently attached by welding, adhesives, or the like. Each mounting plate 16 includes a plurality of teeth 78. Additionally, each mounting plate 16 includes slots 80 for receipt of strap (not shown) which are routed around mounting body 18 (see FIG. 1) to affix tree stand 10 against a side of mounting body 18.

As can also be seen in FIG. 3, seat assembly 12 attaches to the footrest assembly 14 by way of a pair of thumb screws 76. Specifically thumb screws 76 are utilized to fasten longitudinal members 36 of seat 24 to longitudinal member 54 of frame 42. It will be recognized that the use of thumb screws 76 advantageously allow for the rapid disassembly of tree stand 10 without the use of tools or the like. Although thumb screws 76 are shown, it is also contemplated that quick release pins or other types of slidable pins could also be utilized.

Figure 4:
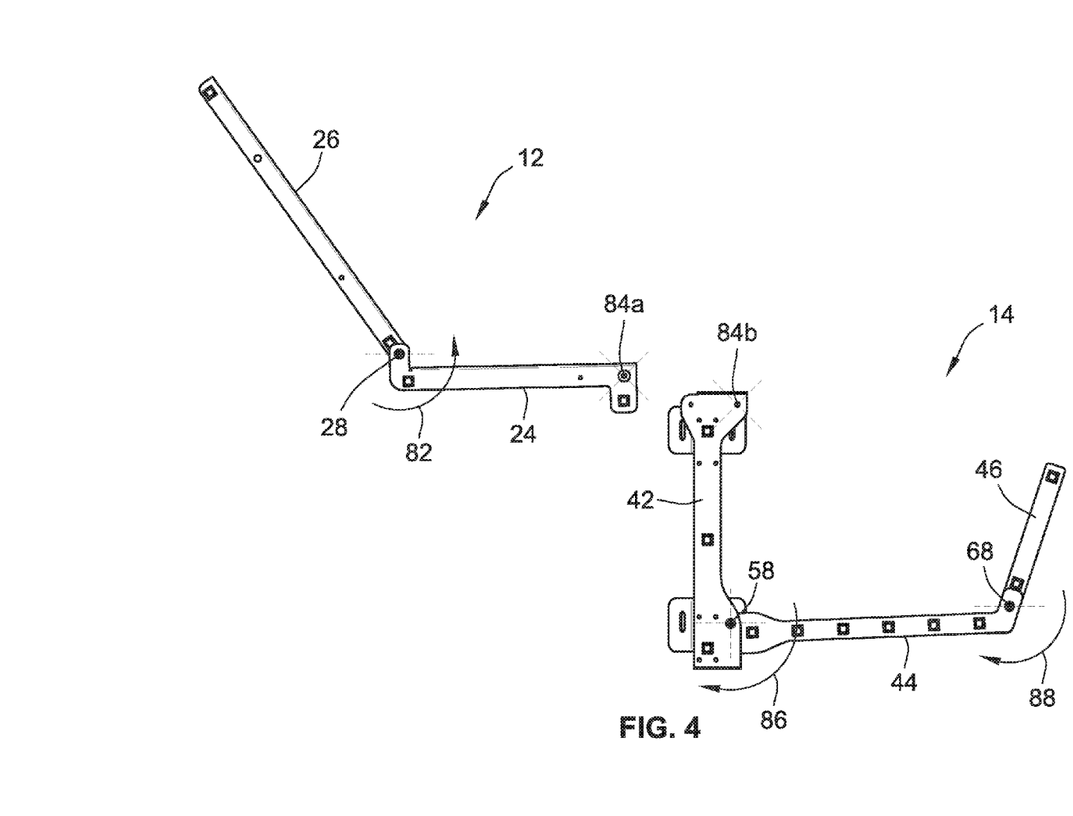
FIG. 4 is a side view of the tree stand of FIG. 1 with a seat sub-assembly thereof separated from a foot-rest sub-assembly thereof.

Turning now to FIG. 4, tree stand 10 is illustrated in a side view depicting the various rotational steps necessary to transition tree stand 4 from its folded to its unfolded configuration. Indeed seatback 26 is rotated in rotational direction 82 about first pivot axis 20 relative to seat 24. Leg extension 44 is rotated in rotational direction 86 about second pivot axis 58 relative to frame 42. Footrest 46 is rotated in rotational direction 88 about third pivot axis 68 relative to leg extension 44. Seat assembly 12 and footrest assembly 14 also joined at connection points 84a, 84b as shown. These sub-assemblies may be first joined and then unfolded as described, or the unfolding may occur first and then the components joined together thereafter.

Figure 5:
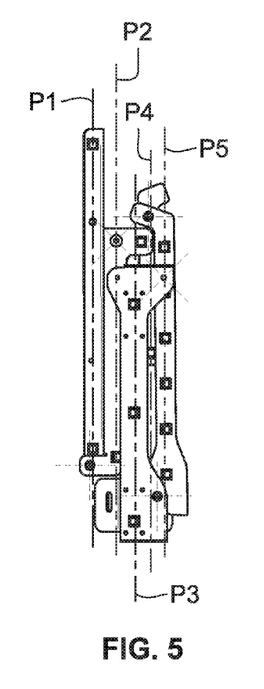
FIG. 5 is a side view of the tree stand of FIG. 1 in the folded configuration.
Figure 6:
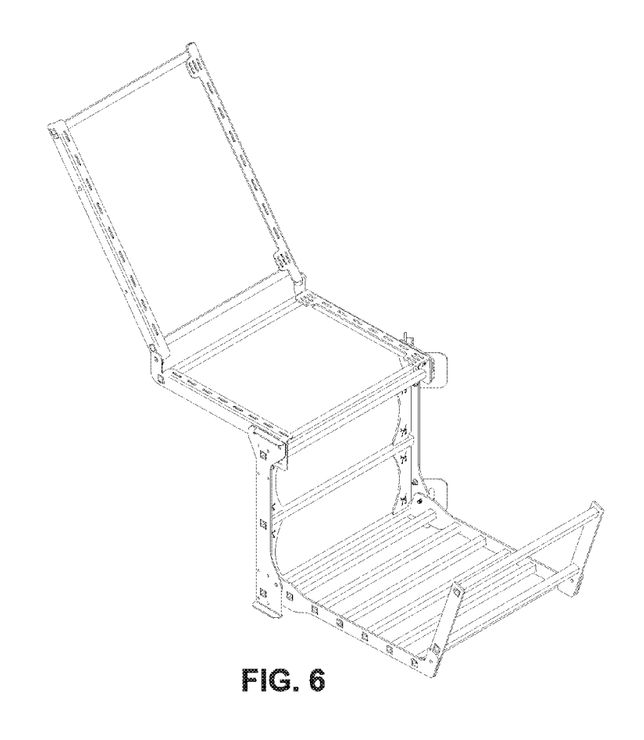
FIGS. 6-13 are perspective and orthogonal views of the tree stand of FIG. 1.
Figure 7:
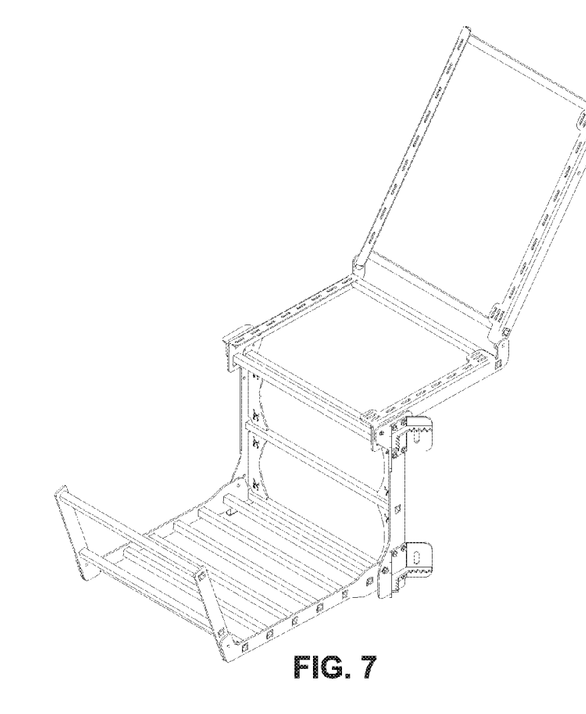
Figure 8:
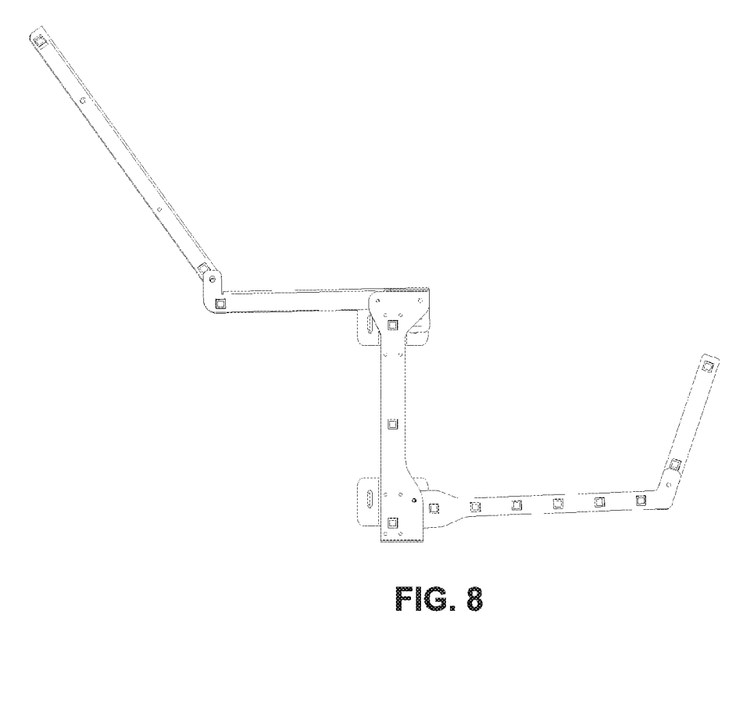
Figure 9:
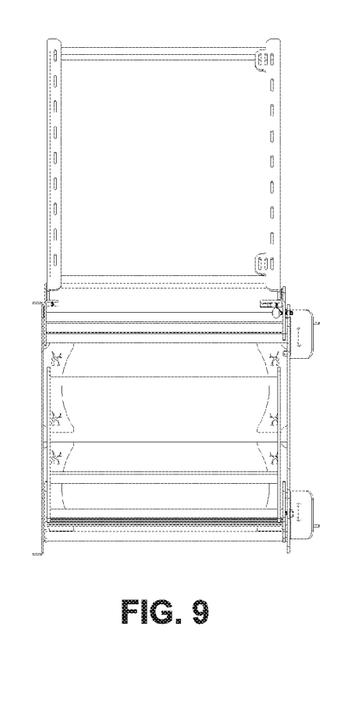
Figure 10:
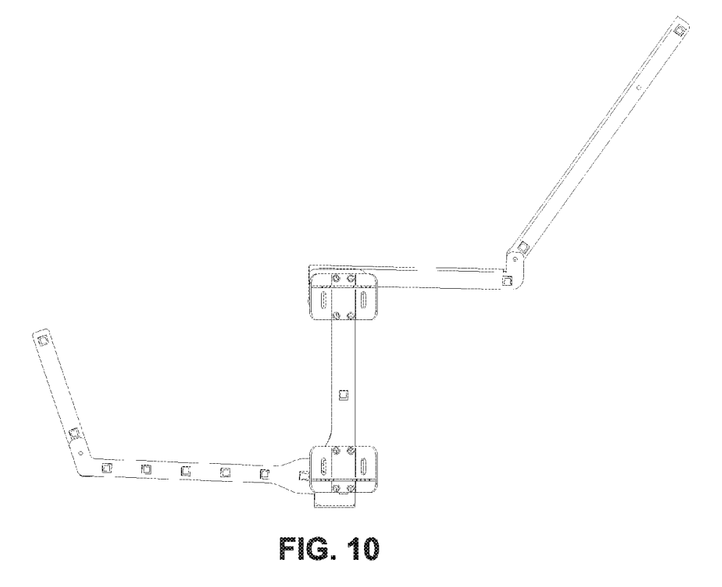
Figure 11:
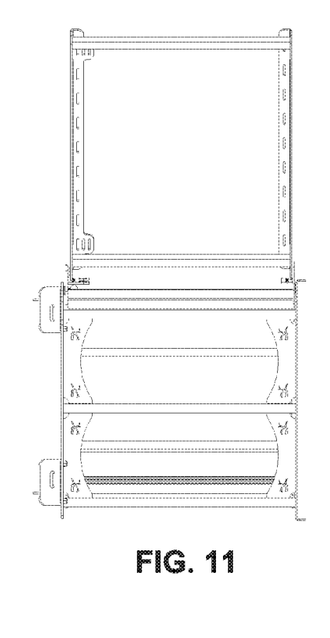
Figure 12:
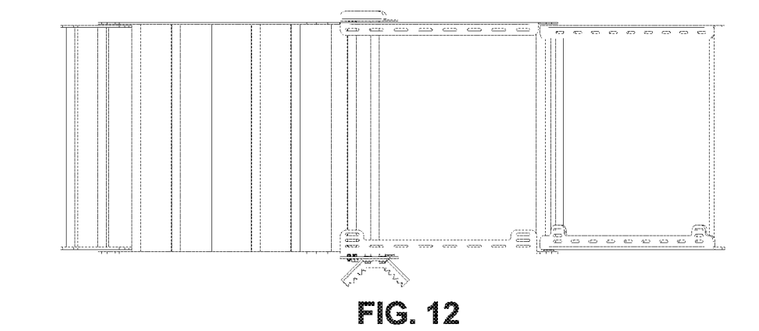
Figure 13:
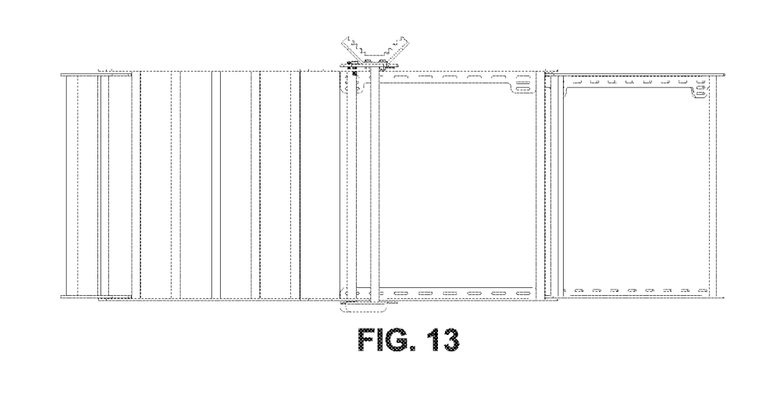

Referring now to FIG. 5, it will be recognized in the folded configuration, tree stand 10 prevents a highly compact design which is easy for a user to carry when traveling on foot or otherwise to their desired hunting location. Indeed, the seatback 26, seat 24, frame 42, leg extension 44, and footrest 46 define planes $P_{1-5}$, respectively, which are parallel to one another in the folded configuration. As can be readily surmised from comparison of FIG. 4 to FIG. 5, tree stand 10 possesses a highly compact design when in its folded configuration.

Tree stand 10 may be manufactured from any suitable rigid material including for example lightweight aluminum. Indeed, the various longitudinal members described above are made of plate or angled stock, while the various lateral members are made of tubular elements. Such a construction provides a strong yet lightweight configuration for use in the field. Further, it will be recognized that the use of the removable side mounting plates position tree stand 10 on the side of a tree or other mounting body allowing a user to recline in the seat thereof. Further, such a configuration allows multiple tree stands to be generally at the same height along a tree or other mounting body and face in the same direction.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A tree stand, comprising:
    a seat assembly including a seat and a seatback mounted to the seat;
    a foot rest assembly including a frame, a leg extension mounted to the frame at a first end of the leg extension, and a foot rest mounted to a second end of the leg extension, wherein the seat assembly is mounted to the foot rest assembly;
    a pair of removable mounting plates for mounting the tree stand to a mounting body in a mounted position such that the seatback is pivotable relative to the seat unobstructed by the mounting body; wherein the frame includes a pair of longitudinal members arranged in an opposed spaced relationship, with a plurality of lateral members extending therebetween, and wherein the leg extension includes a pair of longitudinal members arranged in an opposed spaced relationship, with a plurality of lateral members extending therebetween;

wherein the pair of removable mounting plates are separately mounted directly to one of the pair of longitudinal members of the frame such that one of the removable plates is spaced vertically above the other one of the removable mounting plates along the longitudinal member of the frame; and wherein each of the pair of mounting plates includes a plurality of non-parallel faces with a row of teeth extending across each of the plurality of non-parallel faces.

2. The tree stand of claim 1, wherein the seat assembly defines a first pivot axis, the seatback pivotable about the first pivot axis relative to the seat.

3. The tree stand of claim 2, wherein the seatback is pivotable relative to the seat to position the seatback at an angle of greater than 90 relative to the seat in the mounted position.

4. The tree stand of claim 3, wherein the seat assembly further comprises a strap extending between the seat and the seat back the strap operable to fix a maximum angular orientation of the seatback relative to the seat.

5. The tree stand of claim 1, wherein the seatback includes a pair of longitudinal members arranged in an opposed spaced relationship, with a plurality of lateral members extending therebetween, and further comprises a first plurality of webbings extending between the longitudinal members of the seatback.

6. The tree stand of claim 5, wherein the seat includes a pair of longitudinal members arranged in an opposed spaced relationship, with a plurality of lateral members extending therebetween, and further comprises a second plurality of webbings extending between the longitudinal members of the seat.

7. The tree stand of claim 1, wherein the lateral members of the frame and of the leg extension are rigid tubular members.

8. The tree stand of claim 2, wherein the leg extension is pivotable about a second pivot axis relative to the frame, and wherein the foot rest is pivotable about a third pivot axis relative to the leg extension, wherein the first, second, and third pivot axes are parallel to one another.

9. The tree stand of claim 1, wherein the tree stand has a folded and an unfolded configuration, wherein in the folded configuration the seatback lies in a first plane, the seat lies in a second plane, the frame lies in a third plane, the leg extension lies in a fourth plane, and the foot rest lies in a fifth plane, the first, second, third, fourth, and fifth planes parallel to one another.

* * * * *